United States Patent Office 3,481,898
Patented Dec. 2, 1969

3,481,898
POLYMERIZATION OF SILOXANES
William G. Davies, Penarth, Brian Elliott, Markham, near Blackwood, and Thomas C. Kendrick, Llanblethian Cowbridge, Wales, assignors to Midland Silicones Limited, Reading, England
No Drawing. Filed Apr. 8, 1968, Ser. No. 719,708
Claims priority, application Great Britain, Apr. 10, 1967, 16,350/67
Int. Cl. C08g 31/34
U.S. Cl. 260—46.5
10 Claims

ABSTRACT OF THE DISCLOSURE

Cyclic siloxanes are polymerized to produce organopolysiloxanes having a narrow molecular weight distribution by carrying out the polymerization reaction employing a basic catalyst and terminating the polymerization reaction at a point where the ratio of weight average molecular weight to number average molecular weight is less than 1.6.

---

This invention relates to a method for the polymerization of cyclic diorganosilicon compounds and is particularly concerned with the provision of diorganosilicon polymers having a narrow molecular weight distribution.

The polymerization of cyclic diorganosiloxanes in the presence of basic catalysts to produce high molecular weight linear siloxane polymers has long been known. Included among the catalysts used and proposed for this purpose are alkali metal hydroxides, quaternary ammonium hydroxides, quaternary phosphonium compounds and alkali metal silanolates.

The method by which the polymerization of cyclic siloxanes has been believed to proceed involves the stepwise addition of cyclic siloxane units to a silanolate active center, for example according to the equation

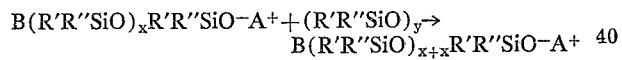

$$B(R'R''SiO)_x R'R''SiO^- A^+ + (R'R''SiO)_y \rightarrow B(R'R''SiO)_{x+x} R'R''SiO^- A^+$$

wherein R' and R'' represent the silicon-bonded organic radicals in the cyclic siloxane, $x$ and $y$ are integers and A and B are the cation and anion formed by the dissociation of the catalyst.

The silanolate active center may exist as the unsolvated ion pair as represented above, as a solvated ion pair or as the free ions. A dynamic equilibrium will exist between these various forms of the silanolate active center and polymerization of the cyclic siloxane will proceed at different rates from each type of center. Formation of the silanolate active center may take place in situ following the addition of the basic catalyst to the cyclic siloxane or it may be pre-formed, for example by the reaction of an alkali metal with a triorganosilanol.

In connection with the above described polymerization mechanism, it is known that side reactions occur during the polymerization process which result in redistribution of siloxane bonds between the silanolate active centers and the polymeric product. One effect of this rearrangement is that the spectrum of the molecular weights of siloxane polymers in the product is broadened. Similar broadening of the molecular weight distribution also arises from the depolymerization reaction and transfer reactions which take place in the system in the presence of water.

Thus, the known processes for polymerizing cyclic siloxanes to the commercially desirable linear polymers lead to products which consist of siloxanes having a very wide distribution of molecular weights and which are characterized by a ratio of weight average molecular weight ($\overline{M}_w$) to number average molecular weight ($\overline{M}_n$) which is often considerably in excess of 2.0. To obtain products having improved and more desirable molecular weight distributions, therefore, it has hitherto been necessary to subject the polymerization product to tedious and expensive fractionation procedures.

The object of this invention is to modify the known polymerization procedures described above to arrive at a polymeric product having a distribution of molecular weights which is significantly narrower than that obtained by conventional techniques. Polymeric organosilicon products obtained in the absence of expensive fractionation processes in which the ratio of weight average molecular weight ($\overline{M}_w$) to number average molecular weight ($\overline{M}_n$) is considerably less than 2.0 are also sought. Other objects and advantages of this invention are detailed in or will be apparent from the following disclosure.

According to this invention there is provided a process for the preparation of an organosilicon polymer comprising (1) polymerizing at a temperature up to 160° C. at least one cyclic organosilicon compound which is (a) a cyclic diorganopolysiloxane of the formula $(R_2SiO)_m$ wherein each R represents a hydrogen atom, a monovalent hydrocarbon radical or monovalent halohydrocarbon radical and $m$ is 3 or 4 or (b) a compound of the general formula

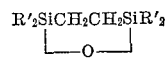

$$R'_2SiCH_2CH_2SiR'_2$$
$$\underset{O}{\underline{\quad\quad\quad}}$$

wherein each R' represents a monovalent hydrocarbon radical, a monovalent halohydrocarbon radical or a lower alkoxy radical, in the presence of a catalytic quantity of a basic catalyst and (2) terminating the polymerization prior to equilibrium and at a point where the ratio of weight average molecular weight ($\overline{M}_w$) to number average molecular weight ($\overline{M}_n$) is less than 1.6.

Cyclic trisiloxanes $(R_2SiO)_3$ and cyclic tetrasiloxanes $(R_2SiO)_4$ can be polymerized according to this invention to obtain linear organosiloxane polymers having a narrow molecular weight distribution. In general, however, it is possible to obtain a lower $\overline{M}_w/\overline{M}_n$ ratio with the cyclic trisiloxanes and the use of such materials is therefore normally preferred.

Also operative in the process of this invention are the cyclic silethylene siloxanes which are polymerizable to organosilicon polymers in which the silicon atoms are joined through ethylene radicals and oxygen atoms.

In the general formulae of the operative cyclic starting materials each R can represent any monovalent hydrocarbon radical, for example an alkyl radical such as the methyl, ethyl, propyl, nonyl and octadecyl radicals, alkenyl radicals such as vinyl, allyl and butenyl radicals and aryl radicals such as the phenyl, tolyl and xylyl radicals. Each R can also represent a hydrogen atom or a monovalent halogenated hydrocarbon radical, for example the chloromethyl, bromophenyl and trifluoropropyl radicals. The radical R' in the cyclic silethylene siloxane can represent the same organic radicals as R and in addition can also represent a lower alkoxy radical, that is, an alkoxy radical containing from 1 to 6 carbon atoms.

Organosilicon polymers containing monovalent hydrocarbon or halohydrocarbon radicals particularly those selected from methyl, vinyl, phenyl and trifluoropropyl radicals are usually of most commercial significance and the preferred cyclic organosilicon materials for use in this invention are those containing such radicals. Preferably, also the cyclic organosilicon compound is the cyclotrisiloxane. If desired, mixtures of cyclic organosilicon compounds can be employed and also if desired R can represent different radicals in any particular cyclic material. Operative cyclic siloxanes for use in the process of this invention therefore include hexamethylcyclotrisiloxane, methylphenylcyclotrisiloxane, methy(trifluoropropyl)cyclotrisiloxane and mixtures thereof. If desired, there can also be incorporated with the cyclic organosilicon material a source of end-stopping units to the polymeric material, e.g. hexamethyldisiloxane.

The basic catalyst can be any which is known in the art for polymerizing cyclic siloxanes. Such catalysts can be represented as AB where A represents, for example an alkali metal atom, a quaternary ammonium radical or a quaternary phosphonium radical and B represents, for example a hydroxy radical, an alkoxy radical, an alkyl radical, an alkenyl radical, an aryl radical or a silanolate residue, e.g. the radical —$OSiX_3$ or $(OSiX_2)_pO$— wherein each X represents an alkyl radical or an aryl radical and $p$ is an integer.

Specific examples of the operative basic catalysts therefore are potassium hydroxide, sodium phenoxide, potassium trimethylsilanolate, tetramethylammonium silanolates, benzyltrimethylammonium silanolate, betahydroxyethyltrimethylammonium siloxanolate, tetramethylammonium butoxide, tetraethylammonium hydroxide, tetramethylphosphonium silanolates, butyl lithium and vinyl lithium. The alkyl, alkenyl or aryl lithium compounds, particularly lithium butyl, are normally preferred as they permit greater control over the polymerization process than is usually obtainable with the more active silanolate compounds.

In the general formula AB of the catalysts, the anion B can be monoacidic, diacidic or polyacidic. Thus, the operative basic catalysts also include, for example, the dilithium salts of disiloxanols.

The basic catalyst is employed in proportions usually employed in the art for the polymerization of cyclic organosilicon compounds. The actual proportion for any given case will depend, for example on the nature of the catalyst. In general, however, proportions of catalyst within the range from 0.01 to 5 percent by weight, based on the weight of the cyclic material, will suffice, although proportions outside this range can be used if desired.

The polymerization reaction is brought about by contacting the cyclic siloxane or mixture of cyclic siloxanes and the basic catalyst at the desired temperature. Conveniently the polymerization is carried out at temperatures within the range from 0° to 40° C. However, temperatures of −20° C. or lower can be used, the minimum temperature being determined primarily by the freezing point of any of the components of the reaction mixture. With increasing temperature, broadening of the molecular weight distribution in the product has been found to occur and desirably the process of this invention is performed at temperatures below about 160° C.

The polymerization process is preferably performed in the presence of an organic solvent, for example toluene or xylene, which aids in thorough and rapid dispersion of the catalyst. Where the catalyst gives rise to alkali metal cations, it has been found particularly advantageous to employ polar solvents which allow strong solvation of the cations and the existence of the silanolate active centers as free ions. Also in some instances lower $\overline{M}_w/\overline{M}_n$ ratios can be obtained if an excess of a soluble salt of the cation is used with a polar solvent in order to suppress free ion formation and ensure that polymerization occurs from free ion pairs only. Examples of suitable polar solvents which can be employed include dimethyl sulphoxide, dimethyl formamide, hexamethylphosphorotriamide, tetramethylurea, tetrahydrofuran, dimethoxyethane and acetonitrile. Dimethylsulphoxide and hexamethylphosphorotriamide are the preferred polar solvents when the catalyst gives rise to potassium (K+) cations. Tetrahydrofuran dimethyl sulphoxide and dimethoxyethane are preferred when the cation is lithium (Li+).

The ratio $\overline{M}_w/\overline{M}_n$ in the polymeriation product will depend to a large extent on the degree to which the polymerization is allowed to proceed. In order to realize $\overline{M}_w/\overline{M}_n$ ratios below 1.6 it is necessary to terminate the polymerization prior to the equilibrium state and before the reaction involving redistribution of the siloxane bonds in the polymer and which causes broadening of the molecular weight distribution of the polymerized product becomes of significance. The desired polymerization period will depend on, for example, the nature of the catalyst, the solvent and the type of cyclic siloxane employed and can vary from seconds to hours. In most cases to obtain $\overline{M}_w/\overline{M}_n$ ratios below about 1.2 it has been found necessary to terminate the polymerization process at the stage at which 50 percent or less by weight of the cyclic starting material has been converted to the polymeric product. Termination of the polymerization process can be achieved by neutralization of the catalyst with a weakly acidic compound and one convenient method comprises adding solid carbon dioxide to the polymerization mixture. Separation of the desired polymer from solvent and unreacted cyclic material remaining in the reaction product can be achieved by any convenient or conventional technique, for example by precipitation, followed if necessary by freeze drying or more preferably by distillation which can be performed under reduced pressure, if desired.

By means of the process of this invention, it has been found possible, by a simple polymerization process, to prepare organosilicon polymers in which the molecular weight distribution can be at least as narrow as that which could be achieved by prior art methods only by the application of tedious fractionation techniques. The process is applicable to the preparation of organosilicon polymers which can vary from freely flowing liquids having molecular weights of about 1,000 to non-flowing, toluene soluble gums having molecular weights of $2 \times 10^6$ or more.

Polymers prepared according to the process of this invention can be employed in any application where the conventional linear siloxane or silethylene siloxane polymers are used, for example they can be used either alone or in conjunction with other siloxanes, solvents or other ingredients in compositions for coating paper and textiles, combined with fillers and vulcanizing agents in the preparation of silicone rubbers or in the formation of greases and compounds. The polymers have flow characteristics approaching Newtonian behavior and are therefore particularly useful as hydraulic fluids and damping media.

The following examples wherein Me represents the methyl radical illustrate the invention.

EXAMPLE 1

Hexamethylcyclotrisiloxane (14.0 g.) was dissolved in about 30 ml. of toluene and the solution then made up with further toluene to a total volume of 50 ml. To the solution was then added 1 ml. of a potassium silanolate catalyst solution which had been prepared by refluxing a mixture of mixed dimethylcyclic siloxanes (148 g.), potassium hydroxide (28 g.) and toluene (200 ml.) for 24 hours and removing the evolved water via a Dean and Stark trap.

The catalyzed mixture was introduced into a glass dilatometer of 40 ml. capacity which was sealed off and inserted in a water bath at 20° C. After 50 minutes the contents of the dilatometer had contracted by 0.061 ml. corresponding to a 10% conversion of the cyclic siloxane into polysiloxane. Solid $CO_2$ was added to the contents of the dilatometer, the mixture filtered and the polymeric siloxane isolated by precipitation with excess methanol and subsequent freeze drying. The weight average molecular weight was 76,500 while the number average molecular weight was 59,300 giving an $\overline{M}_w/\overline{M}_n$ ratio of 1.29.

EXAMPLE 2

Hexamethylcyclotrisiloxane (14 g.) was dissolved in about 30 ml. of toluene and the mixture then made up to a total volume of 50 ml. with further toluene and dried over calcium hydride overnight. To this solution was then added directly 0.05 g. of $KOSiMe_3$. The silanolate dissolved quickly and the mixture was then transferred to a dilatometer which was sealed and placed in a water bath at 20° C. The dilatometer contents contracted by 0.064 ml. after 28 minutes corresponding approximately to a 10% conversion of the cyclic starting material to polymeric siloxane. The catalyst was then neutralized by adding solid $CO_2$, the mixture filtered and the polymeric siloxane isolated by precipitation with excess methanol followed by freeze drying. The $\overline{M}_w$ value was found to be 24,610 and $\overline{M}_n$ 19,160 giving an $\overline{M}_w/\overline{M}_n$ ratio of 1.28.

EXAMPLE 3

50 ml. of a solution of octamethylcyclotetrasiloxane (14 g.) in toluene was dried over calcium hydride. To the filtered solution was added 1 ml. of a solution of 0.607 g. of $KOSiMe_3$ in 50 ml. of dimethyl sulphoxide. This mixture was used to fill a glass dilatometer which was then sealed off and placed in a water bath controlled at 20° C. The manipulations of the solutions were carried out inside a dry box. The dilatometer contents contracted by 0.055 ml. after 5 hours and the reaction was then stopped by addition of solid $CO_2$. The polymer was isolated as previously. $\overline{M}_w$ was 66,000 and $\overline{M}_n$ 46,200 giving an $\overline{M}_w/\overline{M}_n$ ratio of 1.43.

EXAMPLE 4

To 50 ml. of a dried solution of hexamethylcyclotrisiloxane (prepared as in Example 2) was added 0.05 ml. of a solution of $KOSiMe_3$ in dimethyl sulphoxide (0.607 g. of $KOSiMe_3$ in 25 ml. DMSO). The mixture was introduced into a dilatometer which was then sealed off and placed in a water bath maintained at 20° C. After 34 minutes the dilatometer contents had contracted by 0.059 ml. and the polymerization was stopped by the addition of solid carbon dioxide. The polymer was isolated as described in the previous examples.

The values of $\overline{M}_w$ and $\overline{M}_n$ found for the polymeric product were 49,600 and 34,500 respectively, corresponding to a $\overline{M}_w/\overline{M}_n$ ratio of 1.44.

EXAMPLE 5

To 50 ml. of a dried solution of hexamethylcyclotrisiloxane in toluene was added 0.05 ml. of a catalyst solution which consisted of 0.219 g. of $KOSiMe_3$ and 2.4129 g. of KI dissolved in 10 ml. of dimethyl sulphoxide. A dilatometer was filled with this mixture and placed in a water bath at 20° C. After 4½ hours the mixture had contracted by 0.064 ml. and the reaction was then stopped by adding solid carbon dioxide and the polymer isolated as described in the earlier examples herein.

The $\overline{M}_w$ and $\overline{M}_n$ values were found to be 26,350 and 21,560 respectively giving a $\overline{M}_w/\overline{M}_n$ ratio of 1.22.

EXAMPLE 6

To 100 ml. of a solution of hexamethylcyclotrisiloxane (40 g.) in tetrahydrofuran was added 0.005 ml. of a solution of 12.8 g. of n-butyl-lithium in 100 ml. of n-hexane at 20° C. The polymerization reaction was allowed to proceed for 280 minutes at 20° C. after which period it was terminated by the addition of solid carbon dioxide.

The reaction product contained 28 percent by weight of a polydimethylsiloxane of molecular weight 147,000 and $\overline{M}_w/\overline{M}_n$ of 1.05.

EXAMPLE 7

20 ml. of a solution of 40 g. of hexamethylcyclotrisiloxane dissolved in 60 g. of toluene was dried over calcium hydride for 24 hours then filtered, and heated to 100° C. in an oil bath. 0.02 ml. of a solution of 0.15 g. tetramethylammonium silanolate in 25 ml. of dimethyl sulphoxide was then added and the polymerization stopped after 5 minutes. At the end of this period 40% of the hexamethylcyclotrisiloxane had been converted to a polydimethylsiloxane of 100,000 number average molecular weight and with a $\overline{M}_w/\overline{M}_n$ ratio of less than 1.4.

EXAMPLE 8

A 40% solution of hexamethylcyclotrisiloxane in toluene was dried over type 4A molecular sieve for several days. 20 ml. of this solution was transferred to a 50 ml. flask and 0.02 ml. of a solution of 0.15 g. of tetramethylammonium silanolate in 25 ml. of dimethyl sulphoxide added, the transfer being made under anhydrous conditions in a glove box. The polymerization was allowed to go forward for 2 minutes at 25° C. and then stopped. It was found that 70% of the hexamethylcyclotrisiloxane had been converted to a polydimethylsiloxane of 2,800,000 molecular weight and a $\overline{M}_w/\overline{M}_n$ of less than 1.1.

EXAMPLE 9

A 40% solution of methyl(trifluoropropyl)cyclotrisiloxane in tetrahydrofuran was dried over type 4A molecular sieve for 24 hours. To 20 ml. of this solution was added .02 ml. of a solution of 12.8 g. of n-butyl lithium in 100 ml. of n-hexane at 20° C. The polymerization was allowed to proceed for 40 minutes when 30% of the cyclic siloxane had been converted to a polymer having $\overline{M}_w/\overline{M}_n$ ratio of less than 1.4.

EXAMPLE 10

To 25 ml. of a solution of hexamethylcyclotrisiloxane (10 g.) in tetrahydrofuran was added 0.040 ml. of a 2 N solution of lithium vinyl in tetrahydrofuran. Polymerization of the cyclic siloxane then occurred and was allowed to proceed for 90 minutes after which time solid carbon dioxide was added to terminate the reaction. Analysis of the reaction product by gas liquid chromatography showed that it consisted of 34 percent by weight of a polydimethylsiloxane, the remainder being tetrahydrofuran and unreacted cyclic siloxane. Further analysis of the product by gel permeation chromatography established that the polydimethylsiloxane had a molecular weight $\overline{M}_n$ of 38,000 and $M_w/\overline{M}_n$ of 1.21.

EXAMPLE 11

40 ml. of 0.30 molar solution of the dilithium salt of tetramethyldisiloxane 1:3 diol was added to 2 liters of a solution of hexamethylcyclotrisiloxane (800 g.) in tetrahydrofuran. The reaction was allowed to proceed for 115 minutes and was then terminated by the addition of solid carbon dioxide.

It was established by gas-liquid and gel permeation chromatography that the reaction product contained 35 percent by weight of a silanol-terminated polydimethylsiloxane having a molecular weight $\overline{M}_n$ of 56,000 and $\overline{M}_w/\overline{M}_n$ value of 1.26.

EXAMPLE 12

0.10 ml. of a 2 N soltion of lithium butyl in tetrahydrofuran was added 100 ml. of tetrahydrofuran containing 40 g. of methylvinylcyclotrisiloxane

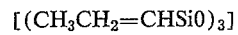
$[(CH_3CH_2=CHSiO)_3]$

Polymerization of the cyclic siloxane commenced and was allowed to proceed for 15 minutes, it then being terminated by the addition of solid carbon dioxide.

Analysis of the reaction product established the presence therein of 38 percent by weight of a polymethylvinylsiloxane having a molecular weight $\overline{M}_n$ of 18,100 and $\overline{M}_w/\overline{M}_n$ value of 1.35.

That which is claimed is:

1. A process for the preparation of diorganosilicon polymer exhibiting narrow molecular weight distribution comprising (1) polymerizing a temperature in the range from the freezing point of reactants up to 160° C., at least one cyclic organosilicon compound which is (a) a cyclosiloxane of the formula $(R_2SiO)_m$ wherein each R represents a hydrogen atom, a monovalent hydrocarbon radical or monovalent halohydrocarbon radical and $m$ has a value of 3 or 4 or (b) a silicon compound of the general formula

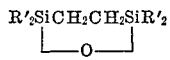

wherein each R' represents a monovalent hydrocarbon radical, a monovalent halohydrocarbon radical or a lower alkoxy radical, in the presence of a catalytic quantity of a basic catalyst selected from the group consisting of alkali metal, quaternary ammonium and quaternary phosphonium hydroxides, alkoxides, alkylates, alkenylates, arylates and silanolates, and (2) terminating the polymerization by deactivation of the catalyst prior to significant redistribution of siloxane bonds in the polymer and prior to equilibrium and at a point where the ratio $\overline{M}_w/\overline{M}_n$ is less than 1.6, $\overline{M}_w$ and $\overline{M}_n$ being weight average molecular weight and number average molecular weight respectively.

2. A process as claimed in claim 1 wherein the cyclic organosilicon compound is a cyclotrisiloxane in which each R is a methyl, vinyl, phenyl or trifluoropropyl radical.

3. A process as claimed in claim 1 wherein the basic catalyst is an alkyl-, alkenyl- or aryl-lithium compound.

4. A process as claimed in claim 3 wherein the basic catalyst is butyl lithium.

5. A process as claimed in claim 1 wherein the polymerization step is carried forward in the presence of an organic solvent.

6. A process as claimed in claim 5 wherein the organic solvent is a polar solvent.

7. A process as claimed in claim 6 wherein the basic catalyst gives rise to lithium cations and the polar solvent is dimethyl sulphoxide, dimethoxyethane or tetrahydrofuran.

8. A process as claimed in claim 6 wherein the basic catalyst gives rise to potassium cations and the polar solvent is dimethyl sulphoxide or hexamethylphosphorotriamide.

9. A process as claimed in claim 1 wherein the polymerization step is terminated at the stage at which 50 percent or less of the cyclic organosilicon compound has been converted to the polymerized product.

10. A process as claimed in claim 1 wherein the polymerization is performed at a temperature within the range from 0 to 40° C.

References Cited
UNITED STATES PATENTS

| | | | |
|---|---|---|---|
| 3,288,712 | 11/1966 | Stark | 252—49.6 |
| 3,294,740 | 12/1966 | McVannel | 260—46.5 |
| 3,337,497 | 8/1967 | Bostick | 260—46.5 |

DONALD E. CZAJA, Primary Examiner

M. I. MARQUIS, Assistant Examiner

U.S. Cl. X.R.

117—155, 161; 260—2, 37, 448.2